United States Patent [19]
Smith

[11] Patent Number: 4,976,542
[45] Date of Patent: Dec. 11, 1990

[54] DIGITAL ARRAY SCANNED INTERFEROMETER

[75] Inventor: William H. Smith, St. Louis, Mo.

[73] Assignee: Washington University, St. Louis, Mo.

[21] Appl. No.: 223,927

[22] Filed: Jul. 25, 1988

[51] Int. Cl.$^5$ ............................ G01B 9/02; G01J 3/45
[52] U.S. Cl. .................................................... 356/346
[58] Field of Search ......................................... 356/346

[56] References Cited

U.S. PATENT DOCUMENTS 4,523,846  6/1985  Breckinridge et al. ............ 356/346
4,750,834  6/1988  Fateley .............................. 356/346

Primary Examiner—Davis L. Willis
Assistant Examiner—Matthew W. Koren
Attorney, Agent, or Firm—Rogers, Howell & Haferkamp

[57] ABSTRACT

An interferometer with a cylindrical lens which produces an interferogram imaging the field of view in the redundant coordinate onto a photon noise limited detector comprising a charge-coupled device or CCD having pixels aligned along two dimensions to provide spatial resolution in that dimension of the light source as well as spectral resolution. The CCD is also characterized by greater dynamic range, lower pixel response variation, and is photon noise limited, all of which enhances its use as a detector for a spectrometer.

15 Claims, 1 Drawing Sheet

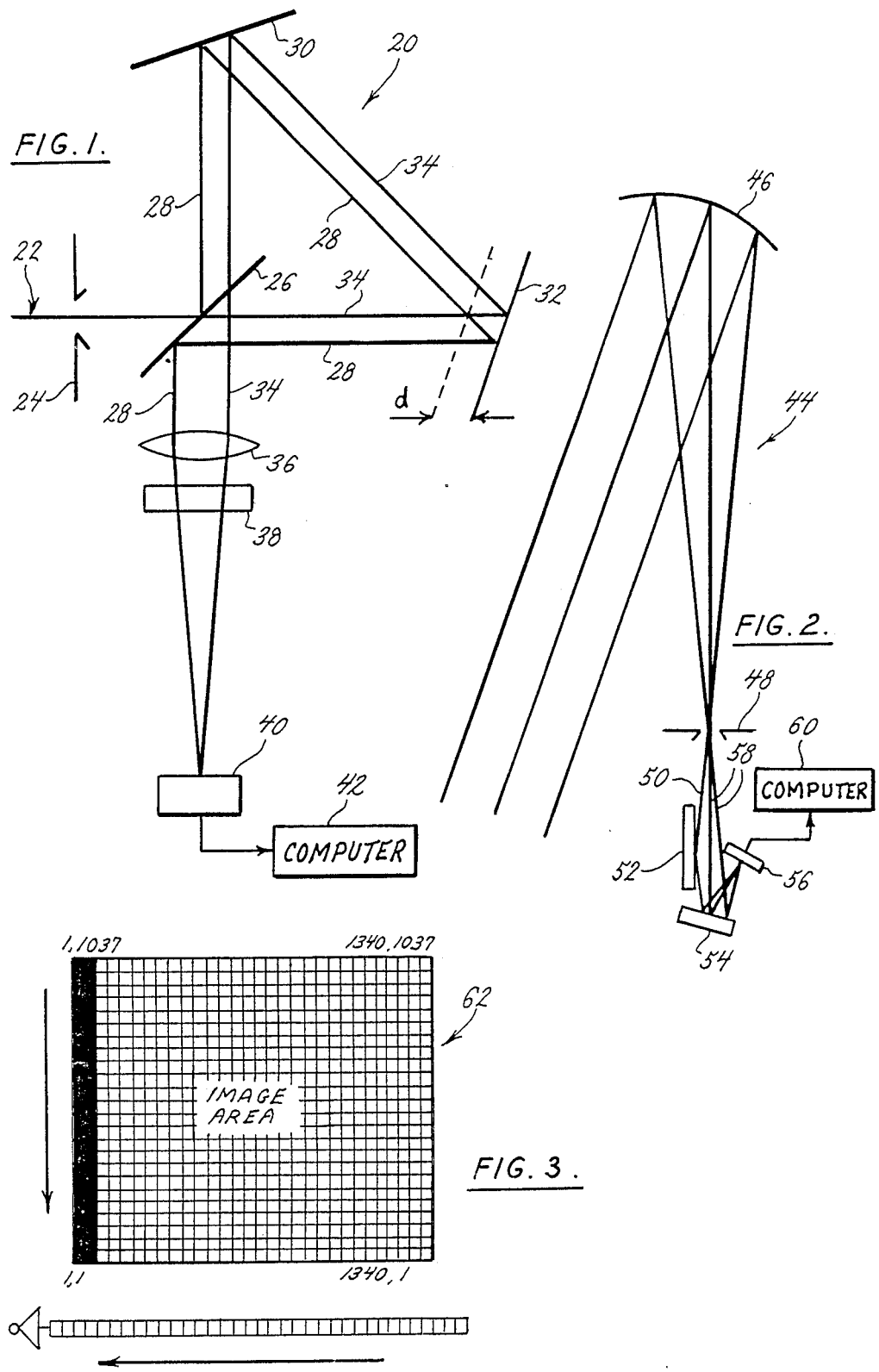

DIGITAL ARRAY SCANNED INTERFEROMETER

BACKGROUND AND SUMMARY OF THE INVENTION

Fourier transform spectroscopy, and spectrographs to perform Fourier transform spectroscopy are well known in the art and generally include an interferometer to produce a fringe pattern of interfering light called an interferogram, which is then measured for relative intensity and analyzed through Fourier transform techniques to determine the frequency components included in the light. There are several types of interferometers commonly used in the prior art including a common path interferometer which is also known as a Sagnac interferometer which utilizes optics for creating multiple light paths, and a Lloyd's mirror type of interferometer which uses mirrors to create multiple light paths and thus avoids the limitations associated with directing the light through optical elements.

Various types of detectors are commonly used in the prior art. Over the past several years, some work has been done utilizing a linear diode array as a detector. A linear photodiode array is comprised of a plurality of elements or diode cells each of which may be approximately 464 micrometers long and 16 micrometers wide with a space between adjacent diodes of approximately 12 micrometers. With this particular arrangement, the length of the diode cell in the vertical axis can be 29 times longer than the width in the horizontal axis across the array. Such a linear photodiode array or linear diode array can be a Matsushita Part No. MN8090. The linear diode array has been proposed as an improvement over the typical detector used in the prior art, i.e. film.

Although film has been used in the prior art as a detector, it suffered from limitations in dynamic range. The dynamic range considerations result from a need to sense the undulations in the fringes created by the interferometer. As well understood, the data of interest resides in the varying intensity in the fringe pattern. The ability to detect this varying intensity is in fact limited by the nature of film. Under the best of circumstances, film can only provide a signal-to-noise ratio, or dynamic range, of approximately 30–50 which equates to $2^6$ bits of depth in the binary gray scale. This dynamic range is insufficient to permit observation of sources with broad spectral content. Restricting the spectral content is not always possible depending upon the phenomenon being observed by the spectrometer. Therefore, film has suffered from dynamic range limitations inherent in the physical means by which film records the incident light.

Still another problem in utilizing film as a detector in the prior art relates to spectral resolution limitations. The greater number of fringes which may be observed increases the spectral resolution and is a factor limited by the size of the optics and the resolution capability of the film being used. The higher the resolution capability of the film, the lower the sensitivity of the film. As known in the field of photography, faster film has coarser grains deposited therein and thus equate to a lower spatial resolution in the film, as is explained above. Slower film has finer grains and is thus capable of greater resolution, but requires a much greater observation time to collect data eventually leading to reciprocity failure of the film. Thus, film inherently limits spectral resolution for thermal light sources to a bandwidth interval consistent with the dynamic range and spatial resolution of the film.

As explained above, the linear diode array represents a partial solution to the problem of using film as a detector. However, it has limitations due to the nature of its construction. Each element of the array is associated with a storage capacitor in which the photo current is integrated, and the entire array is associated with an MOS multiplex switch for periodically reading the data out into an integrated shift register scanning circuit. This architecture introduces a "read" error which is substantial when compared to the current levels being sensed by the array elements. Furthermore, there is a pixel response variation which is also significant. The pixel response variation relates to the difference in sensitivity between the pixel elements of the array which is directly attributable to the particular structure in the architecture and which can vary from one device to another.

To solve these and other problems in the prior art, and also to provide for the first time a spectrometer which can produce spatial resolution from a source, the inventor herein has succeeded in designing and developing a spectrometer which utilizes a charge-coupled device (CCD) as its detector. A charge-coupled device, or CCD, is a two-dimensional silicon array detector which stores the charge on the chip itself and which provides inherently greater capability and signal-to-noise ratio than is achievable with the linear diode array linear photodiode array used in the prior art. A typical CCD, i.e. such as a Thomson CSF Chip No. TH7882CD4 or TI Chip No. 4849 is comprised of an array having 384×576 pixels, each pixel being 22 microns on each side with no dead space between adjacent pixels. Each pixel is capable of a dynamic range of $2^9$ to $2^{10}$ of bits of depth in binary gray scale. Furthermore, the CCD architecture inherently provides for greater dynamic range in that the noise introduced is photon noise dominated above approximately $2^7$ detected photons. In other words, the noise in the signal is proportional to the square root of the number of photons detected, as is typical for photoemissive devices. With this architecture, the signal-to-noise ratio is limited only by the physical and statistical properties of light itself. What this means is that an increased number of measurements of the same source may be added together to improve the signal-to-noise ratio as other noise factors do not become a significant factor in the measurements.

Still another important and significant advantage of using a CCD as a detector is its capability of making measurements in two dimensions. With proper data processing techniques, this two-dimensional data can be used to generate spectral data relating to a specific position or different positions in the field of view. The interferometer may be simply converted to provide spatial information along the dimension parallel to the fringe pattern by using a cylindrical lens in addition to the standard lens to image that dimension onto the detector. In other words, the cylindrical lens preserves the spatial information contained in that dimension of the source which is along the redundant coordinate. In the prior art, a spherical lens or achromat was used to form the interference pattern integrating the field of view along both axes thereby eliminating any ability to discriminate spatial information in the field of view. This prior art approach was typical in that there was no consideration given to spatial resolution as a linear diode array was incapable of providing that resolution. Although that resolution may have been obtainable with film as a detector, the inventor is unaware of any activity or developments which attempted to utilize this spatial data. Thus, the CCD provides a photometric detector which is well suited to providing spatial resolution as well as spectral resolution.

Still another property of a CCD is its lower pixel response variation. Typically, a CCD's pixel response can be maintained within 1%. This is significantly lower than that which is capable of being achieved with the linear diode array architecture. Furthermore, the spatial resolution may be sacrificed (partially or wholly) by integrating along one of the axes of the array, and such integration will dramatically minimize the pixel response variation as the light detected from a number of pixels is added to thereby average out the variation and because of this, improved dynamic range is inherently achievable with a CCD.

A technique known as aliasing may be utilized with a CCD detector. As is known in the art, aliasing involves the shifting of a bandwidth interval of interest from a higher frequency interval to a lower frequency interval such that sampling over those lower frequencies achieve a dramatically higher spectral resolution. With this approach and technique, the detector dynamic range must be very large in order that the data collected may be adequate to attain the spectral resolution desired. With a CCD detector, aliasing is a viable technique whereas with a linear diode array detector aliasing was typically not done in the prior art due to its signal-to-noise and dynamic range limitations.

While the principal advantages and features of the invention have been described above, a greater understanding and appreciation for the invention may be obtained by referring to the drawings and detailed description of the preferred embodiment which follow.

BRIEF DESCRIPTION OF THE DRAWINGS

FIG. 1 is a schematic representation of a common path interferometer with a CCD detector coupled to a computer for Fourier transform analysis;

FIG. 2 is a schematic representation of a Lloyd's mirror interferometer with a CCD detector coupled to a computer for Fourier transform analysis; and FIG. 3 is a schematic representation of a CCD detector.

DETAILED DESCRIPTION OF THE PREFERRED EMBODIMENT

As shown in FIG. 1, a Fourier transform holographic spectrometer 20 processes an incident light source 22 through an aperture 24 to a beam splitter 26 where the light 22 is divided into two beams. A portion of the light is reflected and is represented by beam 28 where it is reflected from a first mirror 30 to a second displaced (distance=d) mirror 32 back to the beam splitter 26 along light path 28 as shown. A second portion of the incident light 22 is transmitted through beam splitter 26 and is represented by path 34. The transmitted light 34 reflects from second displaced (distance=d) mirror 32 back to first mirror 30 and then through beam splitter 26. Thus, the beam splitter 26 and mirrors 30, 32 serve to split the incident light 22 into two paths 28, 34. A detector 40 is then placed at the focus of the spherical lens 36 and a second cylindrical lens 38 focusses the redundant (vertical) dimension of the aperture 24 onto a detector 40. As is well understood in the art, this arrangement produces an interfering light pattern or fringe pattern at the focus of the spherical lens 36, commonly referred to as an interferogram. The cylindrical lens 38 images the relative physical distribution in the source or incident light 22 such that as it impinges on detector 40 and represents the relative spacing for the various sources and their locations in the incident light 22. The detector 40 is a charge-coupled device, or CCD, as best shown in FIG. 3 and described, supra. Alternatively, any photon counting array or photon noise limited device such as a Mercury Cadmium Telluride array, an Indium Antimonide array or a Codacon photon counting array, etc. may be used. The output of detector 40 is processed by a computer 42 using Fourier transform techniques as is well known in the art to resolve the spectrum detected by detector 40. The interferometer represented in FIG. 1 is referred to as a common path or Sagnac interferometer.

In FIG. 2, a second type of interferometer 44 is also shown and which is commonly referred to as a Lloyd's mirror type. It includes a light collecting or telescope mirror 46 which focuses incident light through a slit 48 such that a portion thereof as represented by beam path 50 reflects from plane mirror 52 onto a cylindrical mirror 54 where it is focused onto the detector 56. Still another portion of the light represented by beam paths 58 do not impinge on plane mirror 42 and instead directly strike cylindrical mirror 54 and are focused into an interferogram at the detectors 56. As shown in FIG. 2, the detector 56 is a charge-coupled device or CCD as is best shown representationally in FIG. 3. The output of detector 56 is processed by a computer 60 using Fourier transform techniques to convert the interferogram produced by the interferometer 44 into the spectrum of incident light. This interferometer is characterized by the lack of transmissive optical elements through which the light must pass to form the interferogram. Instead, the light is merely reflected from mirrors so that all wave lengths of light, particularly below 1000 Angstroms, can be measured efficiently.

The charge-coupled device 62 or CCD is shown in greater detail in FIG. 3 and is a typical arrangement as might be used with a camera or the like. As shown therein, the CCD 62 is comprised of a grid of pixels which, in the particular grid shown, is 1037 pixels high by 1340 pixels long. Each individual pixel is capable of having its own output. For the CCD depicted in FIG. 3, each row of pixels has the stored charge shifted down and then shifted out through an amplifier, as shown by the arrows. Also each column may be integrated along its height, such that each column has its output added. This technique eliminates the spatial resolution capability of the CCD 62 but improves the pixel response variation and also increases the sensitivity for intermittent or limited display sources. In the particular detector shown, a pixel size of 6.8 microns on a side with no space between adjacent pixels comprise the display or image area.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In an interferometer having means to process light from a light source to produce a fringe pattern of interfering light (interferogram) in a focal plane, the improvement comprising optic means to image the field of view onto a detector, the detector comprising a two-dimensional, semi-conductor array detector, said detector having means to detect the light intensity of said interferogram along both axes of said two-dimensional array.

2. The device of claim 1 wherein the imaging means has means to image the field of view in only one axis.

3. The device of claim 2 wherein said imaging means comprises a cylindrical optical element.

4. The device of claim 1 further comprising a data processing means associated with said detector, said data processing means having means to determine the spectral content of said detected light.

5. The device of claim 4 wherein the data processing means has means to determine the spatial distribution of said detected light.

6. In an interferometer having means to process light from a light source to produce a fringe pattern of interfering light (interferogram) in a focal plane, and a detector positioned at an image plane having means to detect the varying intensity of the interferogram, the improvement comprising optic means to image the field of view in one dimension onto the detector to thereby preserve the spatial information of the field of view in said one dimension.

7. The device of claim 6 wherein said optic imaging means comprises a cylindrical optical element.

8. The device of claim 7 wherein said optical element comprises a cylindrical lens.

9. The device of claim 7 wherein said optical element comprises a cylindrical mirror.

10. The device of claim 6 wherein the detector has means to detect multiplexed spectral and spatial information from the light source.

11. The device of claim 6 wherein the detector is photon noise limited.

12. The device of claim 6 further comprising means to spectrally resolve the detector output to thereby determine the frequency components of the interferogram.

13. The device of claim 12 further comprising means to resolve the detector output to thereby determine the relative spatial distribution of light along said one dimension in the source producing said interferogram.

14. The device of claim 13 wherein the spatial resolving means has means to determine the relative physical location of different portions of the interferogram, and the spectral resolving means has means to determine the spectral content of said different portions to thereby provide information relating spectral content data to relative physical position in the interferogram.

15. The device of claim 14 wherein the spatial resolving means and the spectral resolving means includes a data processing means.

* * * * *